Jan. 28, 1964    C. F. R. VON KOCH    3,119,939
THERMO-ELECTRICAL GENERATOR
Filed Aug. 16, 1960    3 Sheets-Sheet 1

INVENTOR.
Carl Fabian Richert von Koch
BY
Pierce, Schiffler & Parker
Attorneys

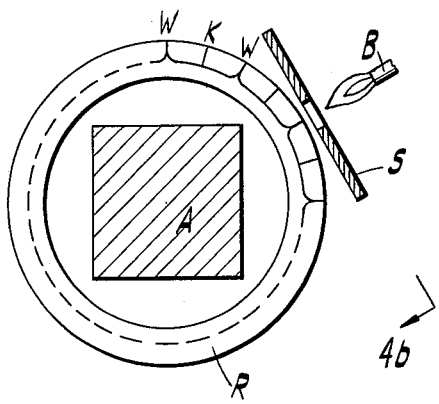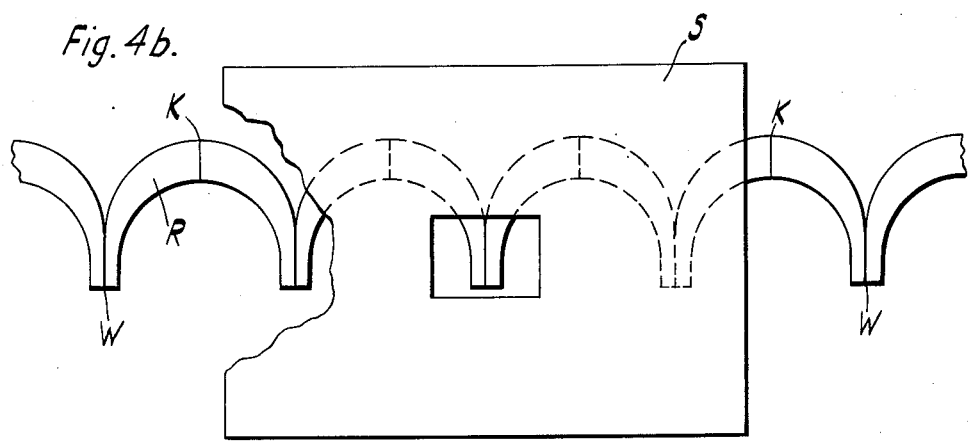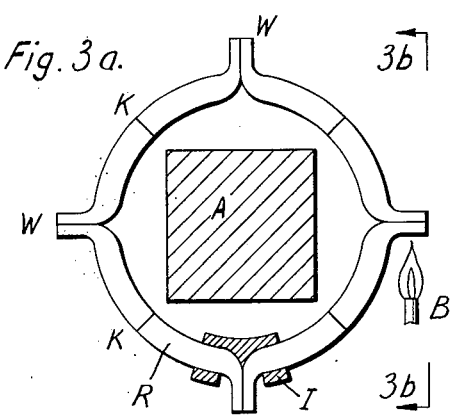

Jan. 28, 1964 C. F. R. VON KOCH 3,119,939
THERMO-ELECTRICAL GENERATOR
Filed Aug. 16, 1960 3 Sheets-Sheet 3
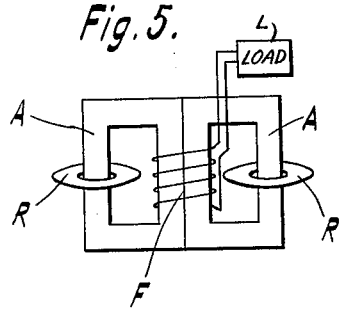
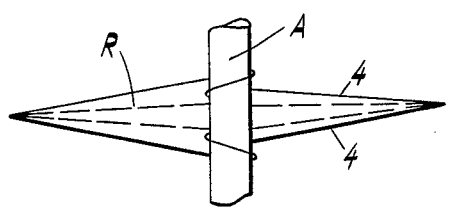
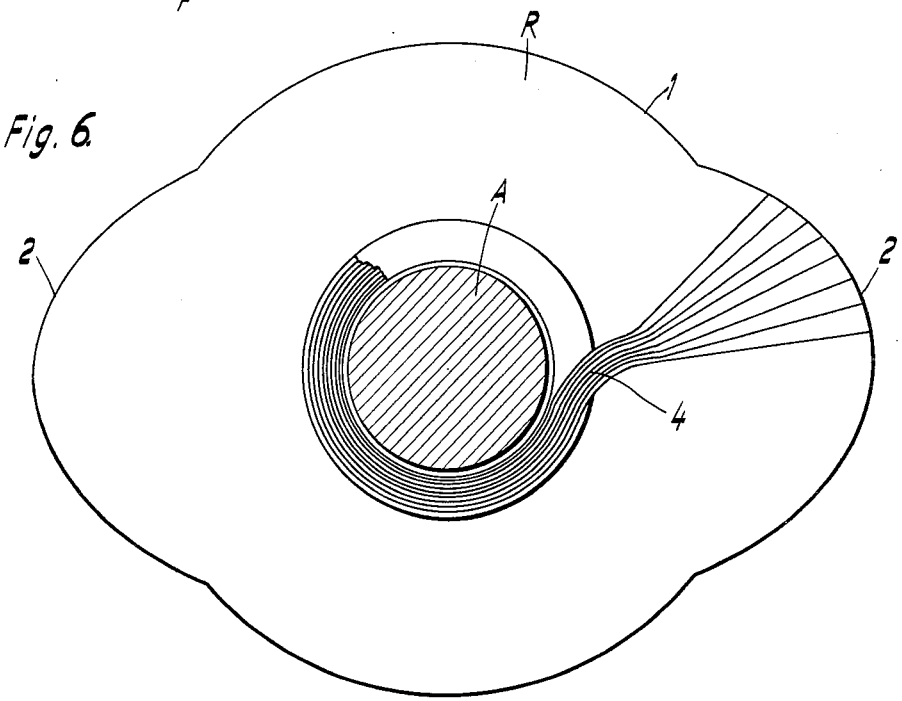
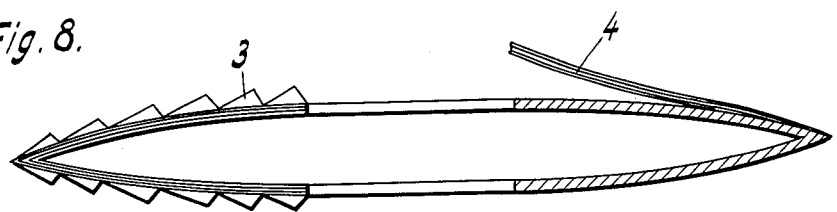
INVENTOR.
Carl Fabian Richert von Koch
BY
Pierce, Schiffler & Parker
Attorneys

United States Patent Office 3,119,939
Patented Jan. 28, 1964

3,119,939
THERMO-ELECTRICAL GENERATOR
Carl Fabian Richert von Koch, Artillerigatan 79,
Stockholm, Sweden
Filed Aug. 16, 1960, Ser. No. 49,899
Claims priority, application Sweden Aug. 20, 1959
15 Claims. (Cl. 310—4)

The efficiency of thermo-electrical generators comprising one or more thermo-couples composed from two solid conductors of different materials is poor and of an order less than 5%. Here and below, the term "efficiency" refers to the ratio of generated electrical output energy to the heat energy received by the generator. Thus, the heating medium and the heat transfer from it to the thermo-electrical generator is not considered.

The E.M.F. produced by a thermo-couple is very low too and is only a low fraction of one volt per degree Celsius (centigrade) whereas the current strength may be several hundreds or even thousands of amperes if the generator is designed for power generation of at least several watts. A further difficulty arises by the fact that thermo-couples do not produce an A.C. voltage but only a constant or varying D.C. potential. Owing to the relatively low potential and high current strength the electrical circuit of a thermo-electric generator should not contain interrupters such as so-called chopping contacts and not even slip rings or any other moving contacts. When designing thermo-electrical generators comprising thermo-couples the paramount obstacle is formed by the empirical law of Wiedemann, Franz and Lorenz which involves that good electrical conductors are good heat conductors so that a heat flow from the heated junction to the cold junction of a thermo-couple cannot be prevented and causes heating of the cold junction whereby the efficiency and electrical power of the thermo-couple is reduced. Hithereto, it has not been possible to convert the produced D.C. energy into A.C. energy by other means than cyclically operating switches or similar switching means. It has also been proposed to produce A.C. by thermo-couples rotating through burner flames so that a combination of D.C. and D.C. is produced, the current being supplied to the primary winding of transformer through slip rings and brushes. The comparatively high frictional and electric losses of such means render the proposed apparatus inefficient and entirely impractical.

The efficiency of a thermo-electric generator is important because an increasement hereof, say from 5 to 10%, involves that, if the electrical power is the same in both cases, the generator need receive and withstand only half of the heat energy so that the heat flow to the cold junction is reduced by at least 50% and the size and weight of the generator may be considerably less.

It is a principal object of the invention to transform the low thermo-electrical voltage produced by a thermo-couple by relatively simple means not requiring cyclically switching means, slip rings or similar devices and thus increase the overall efficiency of the thermo-electrical generator.

In accordance with the invention, the improved thermo-electrical generator comprises one thermocouple forming the primary of a transformer, said thermocouple being composed of dissimilar thermo-electric active materials in conductor form connected in series to establish a thermocouple circuit and including hot and cold junctions, the series connection of the conductors which together form the thermocouple circuit being galvanically closed at all times during operation and the conductors being rigidly joined each to the other, a secondary in inductive relation with said thermocouple circuit and means for periodically heating said hot junction to thereby produce periodic current flow in said thermo-couple circuit and induce periodic current flow in said secondary.

A further improvement of this generator appears possible in view of the following consideration. If the heated junction of a thermo-couple is heated during a short period only so that the thermo-couple receives a definite heat quantum, the heat surge wave travels fairly slowly through the current path of the thermo-couple. FIG. 1 shows the relationship between time and travel path in copper. The heated zone has a non-negligible heat capacity, and, thus, continues to produce electrical current also immediately after the heating period. The heated junction is electrically cooled as production of electric energy involves consumption of an equal amount of heat energy. Thus, as the circuit of the thermo-couple is effectively short-circuited in accordance with the invention and has a low electrical resistance, the junction is more quickly cooled. It should be held in mind that the thermo-electrical voltage is approximately proportional to the temperature difference between the heated and the cold junctions, so that the electric power is approximately proportional to the square of this temperature difference. Consequently, if the heated junction is driven to a very high temperature, a rapid electrical cooling of the junction will take place immediately after the heating period. FIG. 2 shows the temperature drop in time of a heated junction cooled only electrically in the above way.

Heating during a very short period to a high temperature thus may increase the efficiency of A.C. generation and the amplitude of the A.C. component of the thermo-electric current. Besides, the temperature of the heated junction may be temporarily driven to a temperature higher even than that which the junction could withstand continuously. Transmission of heat to the cold junction will be less because cooling by radiation increases with a high power of temperature (theoretically with the fourth power, in practice with a power between the third and the fourth power of temperature) so that the intense short heat wave applied to the heated junction will be quickly dissipated by electric cooling and radiation cooling, and the average heat transmitted to the cold junction will be less than if the heated junction would be kept at a constant temperature equal to the temperature corresponding to the average value of the intermittent heating energy.

According to a further aspect of the invention, the design and operating conditions are chosen such that the temperature of the thermo-electrically active area of the heated junction drops to less than 75%, preferably to not more than 50%, for example to 25% during the first tenth of the cooling period.

Depending on design and operational conditions said electrical cooling and also radiation cooling and enforced cooling of the heated junction may cause a temperature drop so rapid and deep that part of the heat wave travelling in the regions adjacent to the thermo-electrically active junction will flow back to said area and will be partly converted into electrical current and dissipated by radiation and, thus, provides additional cooling and electrical energy of the thermo-couple. That is, the amount of heat transmitted to the cold junction of the thermo-element will be less because the temperature of the heated junction drops at a rate faster than that of the adjacent conductors. Contrary to prior art and knowledge, enforced cooling of the heated junction by, say, air or water, during at least part of the cooling periods may be advantageous for reasons being obvious from the preceding explanation. Of course, also the cold junction may be cooled in any well-known way.

Embodiments of the invention are now explained by way of examples shown in the accompanying drawings, of which:

FIG. 3a is a plan view of a thermo-electrical ring forming a short-circuited primary winding of a transformer. FIG. 3b is an elevational view hereof.

FIGS. 4a and 4b show in a similar way a modification of the ring shown in FIGS. 3a and 3b respectively.

FIG. 5 shows a thermo-electric generator composed from two identical devices in accordance with the invention.

FIG. 6 is a schematic plan view of part of such a device.

FIG. 7 shows scehmatically the electrical connections of the device shown in FIG. 6.

FIG. 8 is a cross-section of the device shown in FIG. 6.

Figure 1:
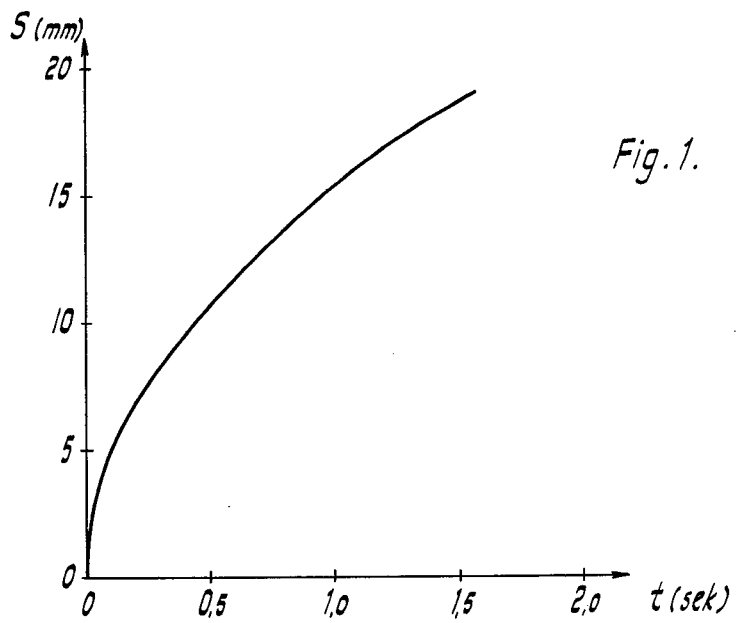
FIG. 1 is a diagraph showing the relationship between distance and time of a heat surge wave travelling in copper.
Figure 2:
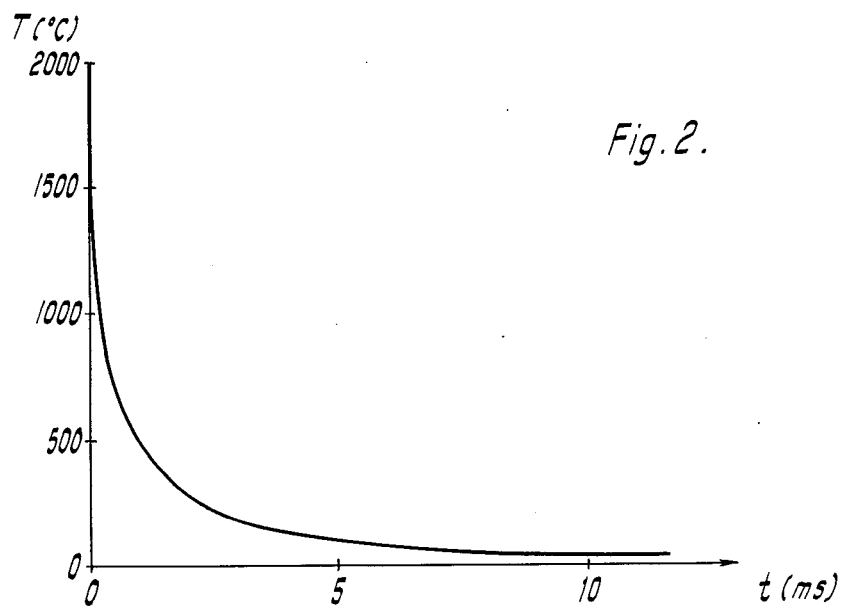
FIG. 2 is a diagraph showing the rate of cooling of the thermo-electrically active contact area of a thermo-couple, said cooling being caused only by the electric energy generated by the thermo-couple.

FIGS. 3a and 3b show an annular thermo-electrical device in accordance with the invention, the device being a ring R which forms a short-circuited primary winding of a transformer having a ferro-magnetic core A. The ring R contains thermo-electrical junctions W to be heated and cold junctions K, each forming the joint of two different solid thermo-electrically active materials which may be metals, alloys and/or semi-conductors such as metal compounds, for example sulphides. The two materials are chosen with due regard to their desired thermo-electrical E.M.F. and heat resistant properties. The heated junctions W form projections extending both radially and axially from the ring R. The heated junctions W and the immediately adjoining portions of the ring conductor should have a relatively very low heat capacity, particularly in comparison with that of the conductive connections between the junctions K and W. The heated junctions should have a relatively large heat-receiving surface which, during the cooling periods between the heating periods, acts as a cooling surface. This surface may be increased by flanges or thin blades. The end portions of the ring conductors in the vicinity of the heated zone may be heat-insulated by a suitable envelope I which is shown at only one of the heated junctions W so that the effective heat capacity of the zone insulated in such way is increased compared with that of the heated junction and that of the cold junction.

The ring R is rotated about its centre axis. A heat source provided by a burner B for a very high temperature is provided such that the flame is directed tangentially to the ring R so that only the heated junctions W pass through the burner flame when the ring is rotating. In the position shown, the pressure of the burning gas of the burner may drive the ring R. The ring surrounds the core A of the transformer and comprises in the present case a short-circuited series-connection of four thermo-couples.

Assuming that the ring rotates 12.5 r./s.=750 r./min., the flame of the burner B is passed 50 times per second by a junction W. Each of the four contacts will be heated about 1 to 3 ms. (milliseconds) and will cool during 79 to 77 ms. as the duration of one complete revolution of the ring is 80 ms. Thus, an A.C. component voltage of 50 cycles per second is produced in the ring and transformed by the transformer. Besides, also a D.C. component is produced which normally is unnecessary and even may be detrimental because it pre-magnetizes the transformer. For this and other reasons the transformer may be provided with an air gap. Apart from the fundamental component of 50 c./s. a number of relatively strong harmonics are produced. Particularly if it is desired to rectify the transformed A.C. voltage, the efficiency can be increased by simple means by using not only the 50 c./s. component but also the harmonics hereof.

Two, four, eight or more burners B may be provided, for example uniformly distributed (angularly equidistant) around the ring. If two or four burners are provided in this way, the frequency, is the same, viz. 50 c./s., as if one burner is provided, but the cooling period is only one half or one quarter, respectively, of that for one single burner. If eight burners are symmetrically arranged, the frequency is 100 c./s. or, alternatively, 50 c./s. if the speed of the ring R is reduced to 375 r./min. If, however, two burners are provided at an angular distance of 45° or an odd multiple hereof, the frequency will be doubled or, alternatively, the speed of the ring may be halved. Thus, by proper choosing the number of burners and thermo-couples, the angular speed of the ring and the angular distance of the burners, it is readily possible to vary such operational conditions as temperature differences and the frequency and wave-form of the thermo-electrical potential.

In practice, the cold junctions K and the core A should be shielded from the heat source or sources. Thus, all parts not to be heated may be covered with a highly reflecting material or, preferably, highly reflecting screens are provided at some distance from the part to be shielded.

The ring R may be cooled by air and/or water. If the speed of the ring is not too high, the axis of the ring may be horizontal and the ring may be partly submerged in water and rotate through it like a mill wheel, the burner being arranged near the non-submerged portion of the ring. The excess heat provided by the heat source can be used for driving the ring and/or cooling means for enforced cooling, for example a propeller heated by the warm air or by steam may be used to drive the ring and to circulate cooling air or water. The ring may even be rotated by the electrical current produced by the ring by acting as a unipolar motor (D.C.-driven) or an eddy current motor (A.C.-driven, preferably by the harmonics of the generated A.C. energy). Normally, such method of driving the ring is less desirable as it absorbs electric energy. FIGS. 4a and 4b show a modification of the device shown in FIGS. 3a and 3b, respectively. The ring R is composed from a relatively great number of thermo-couples, say 24 heated and 24 cold junctions W and K, whereof only a few are shown in the drawing. In this modification, the burner B (or burners) is radially directed to the ring. A fixed heat shield S provided with an aperture is arranged between the burner and the ring R. In the axial direction of the ring, the height of the aperture is not or only slightly greater than that of the heated contacts W. In the circumferential direction, the width of the aperture must be less than the spacing between two adjacent heated contacts W but should preferably be much less. Assuming 24 thermocouples, the angular centre distance between them is 15°, and thus the width of the aperture should be less than 15° but preferably only about 5°. If the speed of the ring is 2 r./s.=120 r./min. so that the fundamental frequency of the generated A.C. component potential is 48 c./s., the width of 5° corresponds to about 7 milliseconds, that is a heating period of 7 ms. One half-wave of this potential is about 21 ms. and, thus, the cooling period is about twice the heating period. Also this example shows, that operational conditions can be readily varied within a broad range.

Naturally, operational conditions can be highly varied by cooling means, variation of dimensions and temperature values, heat-insulating means etc. Optimal conditions can be determined for each individual case.

Until now it has been supposed that the thermo-electric device is moving and that the heat sources are stationary. In practice, it can be both simpler and better to provide intermittent heating in another way such that the ring may be stationary. It may suffice to mention that effective intermittent heat sources are well-known such as pulsating darting flames, pulsatory jet burners and intermittent heat sources of the type used in V1-rockets and ram jets. Besides, continuous burners provided with movable flame shields may be used, such shields being driven, for example, by the flame itself or the heat of the flame in the way indicated above.

Above, only series-connected thermo-couples have been shown. It is, however, possible to use one single thermo-couple only or a number of thermo-couples in parallel.

In many cases it may be sufficient to produce a fairly low frequency, preferably one third or perhaps one fifth of the desired frequency, that is 16⅔ or 10 c./s. if the desired frequency is 50 c./s. It may then be easier to satisfy constructional and operational conditions and to improve electrical conditions, particularly the A.C. efficiency. If the thermo-electrical device forms a winding of a frequency-multiplying transformer, known per se, or if the transformer circuit contains frequency-multiplying means it is possible to convert the fundamental frequency to 50 c./s. and, besides, to use the third (and fifth) harmonic of the fundamental frequency, that is the 50 c./s. harmonic, directly.

FIGS. 5–8 show a thermo-electric generator provided with two thermo-electric rings surrounding different legs of a transformer having preferably three legs as shown in FIG. 5. One of the legs is provided with a secondary winding F. The two rings rotate in synchronism by being mechanically coupled to each other, for example by being provided with teeth around their circumference, the two rings intermeshing hereby (in which case the three legs of the transformer form the corners of a triangle). Alternatively, the two rings may be co-axial and surround a common leg of the transformer.

FIG. 6 shows one of these rings R comprising a disc 1 made from one of the two thermo-electrically active materials. The disc 1 is provided with two projecting portions 2 passing through one or two flames when the ring rotates. These projecting portions may be provided with corrugations or ribs extending in the circumferential direction along the projecting portions 2, such ribs being indicated at 3 only in FIG. 8 described below.

As may be seen from FIG. 7, on either side of the ring R a plurality of electrical conductors 4 made of the second thermo-electrically active material interconnect the opposite edges of the two projecting portions 2 and surround the core of the transformer, and are slightly spaced from the core, each wire forming a primary winding having one or a few turns.

FIG. 8 is a cross-sectional view of the ring, but only part of the conductors 4 on the upper side of the ring are shown. The projections 2 pass through the heating medium and are provided with corrugated parts or ribs 3 which facilitate both the heating and the subsequent cooling of the portions 2.

It can be seen from FIGS. 7 and 8, that the ring body consists of two curved dish-like plates which together have the form of a lens or shell. It might be advantageous to interconnect points of equal temperature on these plates by electrically highly conductive wires or strips extending either on the outside of the shell or within the same.

What I claim is:

1. A thermo-electrical generator comprising at least one thermo-couple forming the primary of a transformer, said thermo-couple being composed of dissimilar thermo-electric active materials in conductor form connected in series to establish a thermocouple circuit and including hot and cold junctions, the series connection of the conductors which together form the thermocouple circuit being galvanically closed at all times during operation and the conductors being rigidly joined each to the other, a secondary in inductive relation with said thermo-couple circuit and means for periodically heating said hot junction to thereby produce periodic current flow in said thermo-couple circuit and induce periodic current flow in said secondary.

2. A thermo-electrical generator as defined in claim 1 wherein said hot junction and the immediately adjoining portions of said thermo-electric active materials have a relatively low heat capacity as compared with that of those materials at said cold junction.

3. A thermo-electrical generator as defined in claim 1 wherein said hot junction is provided with a relatively large heat-receiving surface which during the cooling periods between heating periods acts as a cooling surface.

4. A thermo-electrical generator as defined in claim 1 wherein said hot junction includes flanges to increase the cooling thereof between periodic heating.

5. A thermo-electrical generator as defined in claim 1 wherein the end portions of said thermo-electric active materials in the vicinity of said hot junction are enclosed with heat-insulating material.

6. A thermo-electrical generator as defined in claim 1 wherein said dissimilar thermo-electric active materials are arranged in the form of a ring surrounding a leg of the magnetic core of said transformer, said hot junction being constituted by a projection extending both radially and axially from the plane of said ring.

7. A thermo-electrical generator as defined in claim 1 wherein said dissimilar thermo-electric active materials are arranged in the form of a ring surrounding a leg of the magnetic core of said transformer, and wherein said means for periodically heating said hot junction is constituted by a source of heat and means for producing relative rotation between said ring and said heat source.

8. A thermo-electrical generator as defined in claim 1 wherein said dissimilar thermo-electric active materials are arranged in the form of a stationary ring surrounding a leg of the magnetic core of said transformer, and wherein said means for periodically heating said hot junction is constituted by a source of heat directed upon said hot junction and means for periodically interrupting the heat from said source as related to its impingement upon said hot junction.

9. A thermo-electrical generator comprising a plurality of thermo-couples each as defined in claim 1 arranged electrically in series in the form of a ring surrounding a leg of the magnetic core of said transformer, said ring having a corresponding plurality of hot and cold junctions, and wherein said means for periodically heating said hot junctions comprises a stationary heat source producing a heat beam which is directed periodically on said hot junctions by rotating said ring about its center.

10. A thermo-electrical generator as defined in claim 9 wherein said heat source produces a plurality of heat beams arranged in uniform spaced relation about the path of rotation of said ring.

11. A thermo-electrical generator as defined in claim 1 wherein said dissimilar thermo-electric active materials are arranged in the form of a ring surrounding a leg of the magnetic core of said transformer and wherein said means for periodically heating said hot junction comprises means for rotating said ring about its center, a source of heat producing a heat beam directed toward said ring, and a heat shield including an aperture through which said heat beam passes to said hot junction as said ring is rotated.

12. A thermo-electrical generator as defined in claim 1 wherein said thermo-couple is made in the form of a disc surrounding a leg of the magnetic core of said transformer, said disc being composed of one of said dissimilar thermo-electric active materials and having oppositely projecting portions, and a plurality of electrical conductors made from the other said dissimilar thermo-electric active material interconnecting said oppositely projecting portions of said disc, said electrical conductors having at least one turn around said core leg and one of said projecting portions of said disc serving as the hot junction which is periodically heated.

13. A thermo-electrical generator as defined in claim 12 and which further includes means for rotating said disc and conductor wires about said core leg.

14. A thermo-electrical generator as defined in claim 1 wherein said transformer includes a magnetic core having at least two legs, a thermo-couple in the form of a ring surrounding each core leg, and means for rotating said rings in synchronism about their respective core legs.

15. A thermo-electrical generator as defined in claim 1 wherein at least one of said thermo-electric active materials forms a thin layer upon a surface of the other thermo-electric active material.

References Cited in the file of this patent

UNITED STATES PATENTS 407,762     Acheson _____ July 30, 1889